United States Patent [19]

Tokoro et al.

[11] Patent Number: 5,569,681
[45] Date of Patent: Oct. 29, 1996

[54] FLAME-RETARDANT FOAMED PARTICLES OF POLYOLEFIN RESIN

[75] Inventors: Hisao Tokoro, Kawachi-gun; Kazuo Tsurugai, Utsunomiya; Satoru Shioya, Utsunomiya; Masaharu Oikawa, Utsunomiya, all of Japan

[73] Assignee: JSP Corporation, Tokyo, Japan

[21] Appl. No.: 440,926

[22] Filed: May 15, 1995

[30] Foreign Application Priority Data

May 19, 1994 [JP] Japan .................... 6-129624

[51] Int. Cl.⁶ .................... C08K 5/06; C08K 5/41
[52] U.S. Cl. .................... 521/88; 524/171; 524/373; 524/412
[58] Field of Search .................... 521/88; 524/373, 524/412, 171; 528/174

[56] References Cited

U.S. PATENT DOCUMENTS

| | | | |
|---|---|---|---|
| Re. 34,563 | 3/1994 | Heinz | 528/174 |
| 3,590,014 | 6/1971 | Burt | 521/88 |
| 3,883,481 | 5/1975 | Kopetz et al. | 524/373 |
| 4,006,118 | 2/1977 | Ogawa et al. | 524/171 |
| 5,409,980 | 4/1995 | Myszak | 524/171 |

FOREIGN PATENT DOCUMENTS 55-157636  12/1980  Japan .

Primary Examiner—Veronica P. Hoke
Attorney, Agent, or Firm—Sherman and Shalloway

[57] ABSTRACT

Flame-retardant foamed particles of a polyolefin resin, which contain a bis(alkyl ether)tetrabromobisphenol A flame retardant and/or a bis(alkyl ether)tetrabromobisphenol S flame retardant, and a synergist of the flame retardant, are disclosed. The flame retardant has a bromine content of at least 50 wt. %. The alkyl group in the alkyl ether moiety of the flame retardant is any one of ethyl, propyl, bromoethyl and bromopropyl. The synergist of the flame retardant is selected from the group consisting of antimony oxides, metal oxides, boric acid salts and metal hydroxides. An expansion-molded article is obtained by filling the flame-retardant foamed particles into a mold and molding the foamed particles.

12 Claims, No Drawings

FLAME-RETARDANT FOAMED PARTICLES OF POLYOLEFIN RESIN

BACKGROUND OF THE INVENTION

1. Field of the Invention

The present invention relates to flame-retardant foamed particles of a polyolefin resin, and particularly to flame-retardant foamed particles of a polyolefin resin, which are excellent in physical properties such as fusion-bonding property among the foamed particles and secondary expandability upon their molding.

2. Description of the Background Art

Polyolefin resin foams are widely used in packing materials, automobile parts, building materials and the like. The polyolefin rein foams are produced by methods such as foam extrusion, and foamed-in-place molding in which foamed particles are heated and molded in a mold. Of these, the foamed-in-place molding is used in various fields because it has such advantages that products complicated in shape can be provided.

In recent years, there has been a demand for having automobile parts and building materials have flame retardancy or self-extinguishing property. However, polyolefin resins are naturally high in combustion quality and hence easily burned by electrostatic sparks, to say nothing of a fire. For this reason, although the polyolefin resin foams are excellent in performance characteristics such as cushioning property and thermal insulating property and hence suitable for use in automobile parts, building materials, etc., their high combustion quality has become a large problem upon their use in these fields.

As a method of obtaining a flame-retardant foam, there has heretofore been known a method in which a halogen compound, phosphoric compound, metal hydroxide or the like is kneaded into a resin, and the kneaded mixture is subjected to foam pressing or foam extrusion using a decomposable blowing agent. However, this foaming process has disadvantages that a foam having a high expansion ratio is difficult to provide and that a foam complicated in shape is hard to provide as compared to the foamed-in-place molding.

As flame-retardant or self-extinguishing foams obtained by the foamed-in-place molding, there has been known a foam obtained by subjecting foamed particles obtained from a polystyrene resin with a flame retardant kneaded therein to expansion molding in a mold (the foam obtained by the foamed-in-place molding being hereinafter referred to as the "expansion-molded article"). However, the expansion-molded article of the polystyrene resin has involved a disadvantage that it is poorer in weather resistance, chemical resistance and cushioning property compared with expansion-molded articles of a polyolefin resin.

On the other hand, it has been attempted to impart flame retardancy to an expansion-molded article of a polyolefin resin by kneading a flame retardant into a raw resin for producing foamed particles in advance. However, when the flame retardant is contained in the raw resin for producing the foamed particles, the resulting foamed particles undergo shrinkage, and cells in the foamed particles tend to become fine. Therefore, such foamed particles arise such problems that they are poor in secondary expandability upon their foamed-in-place molding, and an expansion-molded article obtained from such foamed particles becomes poor in surface smoothness. The foamed particles also arise a problem that the resulting expansion-molded article becomes poor in physical properties such as mechanical strength because the fusion bonding property among the foamed particles is deteriorated.

In order to solve such problems, there has also been known a method in which a flame-retardant coating is applied to the surfaces of foamed particles of a polyolefin resin, which were obtained from a resin containing no flame retardant. However, such a method requires a process of applying a flame-retardant coating or the like to the surfaces of the foamed particles before the foamed particles are expansion-molded in a mold after the production of the foamed particles, and hence has a disadvantage that the production process of the expansion-molded article is complicated. In addition, there has been a problem that satisfactory flame retardancy is not given to the expansion-molded article because foamed particles of the polyolefin resin are generally low in acceptance of coating and adhesive property, and so the flame-retardant coating is difficult to sufficiently apply to the surfaces of the foamed particles. Further, the application of the flame-retardant coating or the like to the surfaces of the foamed particles has also offered a problem that the fusion bonding property among the foamed particles upon their molding is lowered, and so there is a tendency to provide an expansion-molded article defective in fusion bonding among the foamed particles.

SUMMARY OF THE INVENTION

With the foregoing in view, the present inventors have carried out an extensive investigation. As a result, it has been found that the above-described problems can be solved by containing a specific flame retardant in foamed particles of a polyolefin resin in combination with a synergist of the flame retardant, thus leading to completion of the present invention.

According to the present invention, there is thus provided flame-retardant foamed particles of a polyolefin resin, which comprise a bis(alkyl ether)tetrabromobisphenol A flame retardant, i.e., 2,2'-bis(4-alkoxy-3,5-dibromophenyl)-propane, and/or a bis(alkyl ether)tetrabromobisphenol S flame retardant i.e., 2,2'-bis(4-alkoxy-3,5-dibromophenyl-sulfone, and a synergist of the flame retardant.

The flame retardant may preferably have a bromine content of at least 50 wt. %.

The alkoxy group in the flame retardant may preferably be any one of ethoxy, propoxy, bromoethoxy and bromopropoxy.

On the other hand, the synergist of the flame retardant may preferably be selected from the group consisting of antimony oxides, metal oxides, boric acid salts and metal hydroxides.

The foamed particles may preferably comprise in combination bis(2,3-dibromopropyl ether)tetrabromobisphenol A, i.e., 2,2'-bis(4-(β,γ-dibromopropoxy)-3,5-dibromophenyl)-propane, and/or bis(2,3-dibromopropyl ether)tetrabromobisphenol S, i.e., 2,2'-bis(4-(β,γ-dibromopropoxy)-3,5-dibromophenyl)-sulfone, as the flame retardant, and antimony trioxide as the synergist of the flame retardant.

The contents of the flame retardant and the synergist of the flame retardant in the foamed particles may preferably be 1–25 wt. % and 0.5–15 wt. %, respectively.

In particular, the content of the synergist of the flame retardant may preferably substantially half the content of the retardant.

According to the present invention, there is also provided an expansion-molded article obtained by filling the flame-retardant foamed particles of the polyolefin resin as described above into a mold and molding the foamed particles.

The foamed particles according to the present invention have both excellent flame retardancy and good moldability such as excellent fusion-bonding property among the foamed particles and secondary expandability upon their molding, and hence permit the compatibility of impartation of flame retardancy with retention of good moldability, which the compatibility has been unable to be achieved in the conventional foamed particles of polyolefin resins. The expansion-molded article obtained from the foamed particles according to the present invention is excellent in physical properties such as mechanical strength, to say nothing of flame retardancy, and besides possesses good cushioning property, thermal insulating property and the like, which are innate properties in foams of the polyolefin resins. Therefore, it is suitable for use in automobile parts, constructional insulating materials and the like and has an advantage that it can check the spread of a fire to the minimum upon the outbreak of the fire or the like, and moreover does not become a combustible. As a result, the foamed particles according to the present invention may be used in various fields of which a self-extinguishing expansion-molded article is required.

The above and other objects, features and advantages of the present invention will become apparent from the following description of the invention and the appended claims.

DETAILED DESCRIPTION OF THE PREFERRED EMBODIMENTS

Examples of a polyolefin resin from which the foamed particles according to the present invention are made up include olefin homopolymers such as various kinds of polyethylene such as high-density polyethylene, medium-density polyethylene, branched low-density polyethylene and linear low-density polyethylene, polypropylene, and polybutene. Copolymers of two or more olefins, such as ethylene-propylene random copolymers, ethylene-propylene block copolymers and ethylene-propylene-butene terpolymers, and copolymers of an olefin with another monomer, such as ethylene-vinyl acetate copolymers and ethylene-ethyl acrylate copolymers may also be mentioned. These resins may be either crosslinked or uncrosslinked.

The flame retardant useful in the practice of the present invention is a bis(alkyl ether)tetrabromobisphenol A flame retardant, i.e., 2,2'-bis(4-alkoxy-3,5-dibromophenyl)-propane, and/or a bis(alkyl ether)tetrabromobisphenol S flame retardant, i.e., 2,2'-bis(4-alkoxy-3,5-dibromophenyl)-sulfone. Specific examples of the above flame retardants include bis(2,3-dibromopropyl ether)tetrabromobisphenol A, bis(2,3-dibromopropyl ether)tetrabromobisphenol S, bis-(methyl ether)tetrabromobisphenol A, bis(methyl ether)tetrabromobisphenol S, bis(bromoethyl ether)tetrabromobisphenol A and bis(bromoethyl ether)tetrabromobisphenol S. The flame retardant preferably has a bromine content of at least 50 wt. %. The alkoxy group in the flame retardant is preferably any one of ethoxy, propoxy, bromoethoxy and bromopropoxy, and particularly 2,3-dibromopropoxy. It is desirable that the alkoxy groups in the two flame retardants be identical with each other.

Examples of the synergist of the flame retardant used in combination with the flame retardant include antimony oxides, metal oxides, boric acid salts and metal hydroxides. Examples of the antimony oxides include antimony trioxide and antimony pentoxide. Examples of the metal oxides include aluminum oxide, titanium oxide, molybdenum oxide and zinc oxide. Examples of the boric acid salts include zinc borate and sodium borate. Examples of the metal hydroxides include aluminum hydroxide and magnesium hydroxide. These synergists of the flame retardant may be those subjected to a surface treatment with a coupling agent such as a silane or titanate coupling agent, a fatty acid, or the like as needed. Antimony trioxide is particularly preferred as the synergist of the flame retardant. In the present invention, a combination of antimony trioxide as the synergist of the flame retardant with bis(2,3-dibromopropyl ether)tetrabromobisphenol A and/or bis(2,3-dibromopropyl ether)tetrabromobisphenol S as the flame retardant is particularly preferred.

The content of the flame retardant in the foamed particles is preferably 1–25 wt. %, more preferably 1–15 wt. %. The content of the synergist of the flame retardant in the foamed particles is preferably 0.5–15 wt. %, more preferably 0.5–10 wt. %. In particular, the content of the synergist of the flame retardant in the foamed particles is preferably substantially half the content of the retardant because the flame retardancy-imparting effect is most markedly exhibited. If the content of the flame retardant in the foamed particles is lower than 1 wt. %, a sufficient flame retardancy-imparting effect cannot be brought about. On the other hand, any content exceeding 25 wt. % involves difficulty in uniformly dispersing the flame retardant in a base resin of the foamed particles. In addition, the foamed close-cell particles structure, i.e., the resulting foamed particles becomes an open-cell structure, resulting in reduction of moldability and deterioration in physical properties of an expansion-molded article obtained from such foamed particles.

The flame retardancy of the expansion-molded article is evaluated in accordance with the flammability test using the oxygen index method. If the oxygen index of a sample as determined in accordance with the flammability test using the oxygen index method (JIS K 7201-1976) is at least 27, the sample satisfies the incombustibility standard for polystyrene foam heat insulators prescribed in JIS A 9511 and the V-2 standard prescribed in UL-94. Therefore, in the foamed particles according to the present invention, it is preferable to select the contents of the flame retardant and the synergist of the flame retardant in such a manner that the oxygen index of the foamed particles is at least 27 as determined in accordance with the flammability test using the oxygen index method.

The foamed particles according to the present invention can be produced by any known method, for example, a method in which resin particles containing the flame retardant and the synergist of the flame retardant are dispersed in a dispersion medium together with a blowing agent in a closed vessel to heat the resultant dispersion to a predetermined temperature, thereby impregnating the resin particles with the blowing agent, the foamable resin particles impregnated with the blowing agent are then released under atmospheric pressure from the inside of the vessel, thereby expanding the resin particles. The resin particles used as a raw material for the foamed particles according to the present invention are produced by, for example, a method in which a polyolefin resin is melted in an extruder, the melt is extruded in the form of a strand from an orifice of the extruder, and the strand thus extruded is then chopped into particles. The flame retardant and the synergist of the flame retardant can be contained in the resin particles by, for example, a method they are kneaded into the resin melted in the extruder.

In the case where the foamed particles are produced by the method described above, it is permissible to contain only the synergist of the flame retardant in the resin particles used as the raw material for the foamed particles in advance and impregnate the resin particles with the flame retardant at the same time in the course of the impregnation of the blowing agent into the resin particles.

No limitation is imposed on the dispersion medium dispersing the resin particles therein in the closed vessel upon the production of the foamed particles so far as it does not dissolve the resin particles. Examples of such a dispersion medium include water, ethylene glycol, glycerol, methanol and ethanol. Water is however used in general. The proportion of the dispersion medium to the resin particles is preferably 150–500 parts by weight per 100 parts by weight of the resin particles for the purpose of enhancing the stirring efficiency of the resin particles dispersed in the dispersion medium.

An anti-fusing agent for the prevention of fusion bonding among the resin particles in the vessel may be added into the dispersion medium as needed. Any anti-fusing agent may be used as such an anti-fusing agent, irrespective of inorganic and organic agents so far as it neither dissolves in the dispersion medium nor melts upon the heating. However, inorganic anti-fusing agents are generally preferred. Examples of the inorganic anti-fusing agents include aluminum oxide, titanium oxide, aluminum hydroxide, basic magnesium carbonate, basic zinc carbonate, calcium carbonate, tricalcium phosphate, magnesium pyrophosphate, talc, kaolin and clay.

The particle size of the anti-fusing agent is preferably 0.001–100 μm, particularly, 0.001–30 μm. In general, the amount of the anti-fusing agent to be added is preferably 0.01–10 parts by weight per 100 parts by weight of the resin particles.

The inorganic anti-fusing agent is preferably used in combination with a surfactant. As such a surfactant, there may suitably be used an anionic surfactant such as sodium dodecylbenzenesulfonate, sodium α-olefinsulfonate, sodium alkylsulfonate or sodium oleate. It is preferable to add the surfactant in a proportion of 0.001–5 parts by weight per 100 parts by weight of the resin particles in general.

As the foaming agent, there may be used one of volatile blowing agents or a mixture of two or more of the volatile blowing agents. Alternatively, inorganic gas blowing agents may be used either singly or in any combination thereof. One or more of the volatile blowing agents may be used in combination with one or more of the inorganic gas blowing agents.

Examples of the volatile blowing agents include aliphatic hydrocarbons such as propane, butane, pentane, hexane and heptane, and alicyclic hydrocarbons such as cyclobutane and cyclopentane. Halogenated hydrocarbons such as trichlorofluoromethane, dichlorodifluoromethane, dichlorotetrafluoroethane, methyl chloride, ethyl chloride and methylene chloride may also be used. On the other hand, as the inorganic gas blowing agents, there may be used nitrogen, carbon dioxide, argon, air and the like.

The amount of the blowing agent to be added may vary according to the kinds of the resin particles and blowing agent to be used, the intended expansion ratio, and the like. However, the amount of the blowing agent required to obtain foamed particles having an expansion ratio of about 5–60 times is generally about 2–50 parts by weight per 100 parts by weight of the resin particles.

The blowing agent can be impregnated the resin particles by dispersing the resin particles and the blowing agent in the dispersion medium in a closed vessel and holding the resulting dispersion under heat while stirring it. The heating temperature for impregnating the resin particles with the blowing agent is preferably preset to a foaming temperature in general. The foaming temperature means a temperature at which the resin particles impregnated with the blowing agent are foamable upon releasing the pressure applied to the resin particles. When particles of, for example, an uncrosslinked polyolefin resin are used, any optional temperature may be selected from a range of from about (the melting point of the resin $-15°$ C.) to about (the melting point $+15°$ C.). The holding time under heat for impregnating the resin particles with the blowing agent may vary according to the kinds of the resin and blowing agent to be used, the compounding ratio thereof, and the like. However, it is generally about 5–120 minutes.

After impregnating the resin particles with the blowing agent as described above, the resin particles and the dispersion medium are simultaneously released into an atmosphere of a pressure lower than the internal pressure of the vessel, thereby expanding the resin particles. As the atmosphere into which the resin particles are released from the inside of the vessel, there may be used the atmosphere in general. It is also preferable to introduce a pressurizing gas into the vessel upon the release of the resin particles and dispersion medium so as not to lower the internal pressure of the vessel as the resin particles and dispersion medium are released from the inside of the vessel, thereby keeping the internal pressure of the vessel a pressure higher than the atmospheric pressure.

In order to obtain an expansion-molded article having a desired shape from the foamed particles of the present invention thus obtained, there may be used the known method in which the foamed particles according to the present invention are filled into a mold corresponding to the intended form and heated with steam or the like, thereby expanding them. According to the foamed particles of the present invention, the flame retardancy of the resulting expansion-molded article is not changed by a difference in expansion ratio. Therefore, no particular limitation is imposed on the range of the expansion ratio of the foamed particles according to the present invention, and the expansion ratio may be optionally determined as necessary for the intended application of an expansion-molded article to be finally obtained. However, the expansion ratio of the foamed particles according to the present invention is generally 5–100 times or so in terms of bulk expansion ratio.

The present invention will hereinafter be described in further detail by the following examples.

EXAMPLES 1–5 AND COMPARATIVE EXAMPLES 1–6

A flame retardant and a synergist of the flame retardant were added to a propylene-ethylene random copolymer resin (ethylene content: 2.3 wt. %, MI: 10 g/10 min, density: 0.9 g/cm$^3$ melting point: 146.5° C. melting completion temperature: 163° C.). The resultant mixtures were each melted and kneaded in a pressure kneader and then formed into pellets. Incidentally, in Comparative Example 5, only the flame retardant was added, while only the synergist of the flame retardant was added in Comparative Example 6.

Thereafter, the pellets formed above were mixed with pellets formed of the same resin as described above and containing neither the flame retardant nor the synergist of the flame retardant in such a manner that contents of the flame retardant and the synergist of the flame retardant in the resin amounted to its corresponding respective amounts shown in Table 1. The mixture thus obtained was melted and kneaded in an extruder, and the melt thus kneaded was extruded in the form of a strand out of the extruder. The strand was immediately introduced into water to quench it. The strand was then chopped by a pelletizer to provide resin particles. The average weight of the thus-obtained resin particles was 2 mg.

In a 5-liter autoclave, 1 kg of the thus-obtained resin particles, 3 g of kaolin as a dispersing agent, 0.2 g of sodium dodecylbenzenesulfonate as a surfactant and 80 g of carbon dioxide as a blowing agent were dispersed in 3,000 cc of water as a dispersion medium. While stirring the contents of the autoclave, the interior of the autoclave was heated to 152° C., and the contents were held for 15 minutes at that temperature. While introducing high-pressure carbon dioxide gas of a pressure equal to the equilibrium vapor pressure within the autoclave at the time the contents were held at 152° C., into the autoclave, the vessel was opened at one end thereof to simultaneously release the resin particles and water under the atmospheric pressure, thereby expanding the resin particles.

The thus-obtained foamed particle samples were each filled into a mold (internal dimensions: 300 mm×300 mm×50 mm), and heated with steam (3.0 kg/cm$^2$G), thereby obtaining an expansion-molded article. The flame retardancy of the thus-obtained expansion-molded article was determined in accordance with "Testing Method for Flammability of Polymeric Materials Using the Oxygen Index Method" described in JIS K 7201 and evaluated. The measurement of the oxygen index was performed by means of an incombustibility tester (ON-1 model) manufactured by SUGA TEST INSTRUMENTS CO., LTD. The results are shown collectively in Table 1.

Incidentally, the secondary expandability and the fusion bonding property shown in Table 1 were evaluated in accordance with the following methods.

(1) Secondary expandability:

Each expansion-molded article was externally observed and the secondary expandability was ranked in accordance with the following standard:

A: Dimples between foamed particles were scarcely observed on the surface;

B: Dimples between foamed particles were partly observed on the surface; and

C: Dimples between foamed particles were observed on the entire surface.

(2) Fusion bonding property:

A sliced plate obtained by cutting out each expansion-molded article into dimensions of 1 cm thick, 5 cm wide and 10 cm long was stretched in a longitudinal direction to break it, and its rupture cross-section was observed to rank it in accordance with the following standard:

A: Non-interparticle breakage occurred on not less than 60% of the rupture cross-section;

B: Non-interparticle breakage occurred on not less than 40%, but less than 60% of the rupture cross-section;

C: Non-interparticle breakage occurred on less than 40% of the rupture cross-section.

TABLE 1

|  | Flame retardant (Amount added, wt. %) | Synergist of flame retardant (Amount added, wt. %) | Expansion ratio (times) | Oxygen index | Moldability Secondary expandability | Fusion bonding property |
| --- | --- | --- | --- | --- | --- | --- |
| Ex. 1 | Bis(2,3-dibromopropyl ether) tetrabromobisphenol S (3.0) | Antimony trioxide (1.5) | 30 | 28 | A | A |
| Ex. 2 | Bis(2,3-dibromopropyl ether) tetrabromobisphenol A (3.0) | Antimony trioxide (1.5) | 30 | 29 | A | A |
| Ex. 3 | Bis(2,3-dibromopropyl ether) tetrabromobisphenol S (5.0) | Antimony trioxide (2.5) | 32 | 32 | A | A |
| Ex. 4 | Bis(2,3-dibromopropyl ether) tetrabromobisphenol S (2.5) | Antimony trioxide (2.5) | 28 | 27 | A | A |
| Ex. 5 | Bis(2,3-dibromopropyl ether) tetrabromobisphenol S (1.7) | Antimony trioxide (3.3) | 29 | 27 | A | A |
| Comp. Ex. 1 | Tetrabromobisphenol A (3.0) | Antimony trioxide (1.5) | 26 | 25 | A | C |
| Comp. Ex. 2 | Decabromodiphenyl ether (3.0) | Antimony trioxide (1.5) | 34 | 27 | C | A |
| Comp. Ex. 3 | Hexabromobenzene (3.0) | Antimony trioxide (1.5) | 33 | 25 | B | C |
| Comp. Ex. 4 | Hexabromocyclododecane (3.0) | Antimony trioxide (1.5) | 28 | 28 | C | A |
| Comp. Ex. 5 | Bis(2,3-dibromopropyl ether) tetrabromobisphenol S (5.0) | — | 29 | 22 | A | A |
| Comp. Ex. 6 | — | Antimony trioxide (5.0) | 25 | 18 | A | A |

What is claimed is:

1. Flame-retardant foamed particles of a polyolefin resin, wherein the resin is mixed with a 2,2'-bis(4-alkoxy- 3,5-dibromophenyl)-propane flame retardant and/or a 2,2'-bis(4-alkoxy-3,5-dibromophenyl)-sulfone flame retardant, and a synergist for the flame retardant.

2. The flame-retardant foamed particles according to claim 1, wherein the flame retardant has a bromine content of at least 50 wt. %.

3. The flame-retardant foamed particles according to claim 1, wherein the alkoxy group in the flame retardant is any one of ethoxy, propoxy, bromomethoxy and bromopropoxy.

4. The flame-retardant foamed particles according to claim 1, wherein the synergist for the flame retardant is selected from the group consisting of antimony oxides, metal oxides, boric acid salts and metal hydroxides.

5. The flame-retardant foamed particles according to claim 1, 2, 3 or 4, wherein the flame retardant is 2,2'-bis(4-β,γ-dibromopropoxy)-3,5-dibromophenyl)-propane and/or 2,2'-bis(4-(β,γ-dibromopropoxy)-3,5-dibromophenyl)-sulfone, and the synergist for the flame retardant is antimony trioxide.

6. The flame-retardant foamed particles according to claim 1, wherein the contents of the flame retardant and the synergist for the flame retardant in the foamed particles are 1–25 wt. %, and 0.5–15 wt. %, respectively.

7. The flame-retardant foamed particles according to claim 6, wherein the content of the synergist of the flame retardant is substantially half the content of the retardant.

8. An expansion-molded article obtained by filling the flame-retardant foamed particles of the polyolefin resin according to claims 1 or 6 into a mold and molding the foamed particles.

9. Flame-retardant close-cell foamed particles of a polyolefin resin, wherein the resin is mixed with a 2,2'-bis(4-alkoxy-3,5-dibromophenyl)-propane and/or a 2,2'-bis(4-alkoxy- 3,5-dibromophenyl)-sulfone, and a synergist for the flame retardant, wherein the flame retardant is 2,2'-bis(4-β, γ-dibromopropoxy)- 3,5-dibromophenyl)-propane and/or 2,2'-bis(4-(β,γ-dibromopropoxy)- 3,5-dibromophenyl)-sulfone, and the synergist of the flame retardant is antimony trioxide.

10. The flame-retardant foamed particles according to claims 9, wherein the contents of the flame retardant and the synergist of the flame retardant in the foamed particles are 1–25 wt. %, and 0.5–15 wt. %, respectively.

11. The flame-retardant foamed particles according to claim 10, wherein the content of the synergist of the flame retardant is substantially half the content of the retardant.

12. An expansion-molded article obtained by filling the flame-retardant foamed particles of the polyolefin resin according to any one of claims 9, 10 or 11 into a mold and molding the foamed particles.

* * * * *